United States Patent [19]

Sejnoha

[11] Patent Number: 5,465,318
[45] Date of Patent: Nov. 7, 1995

[54] METHOD FOR GENERATING A SPEECH RECOGNITION MODEL FOR A NON-VOCABULARY UTTERANCE

[75] Inventor: Vladimir Sejnoha, Cambridge, Mass.

[73] Assignee: Kurzweil Applied Intelligence, Inc., Waltham, Mass.

[21] Appl. No.: 79,704

[22] Filed: Jun. 18, 1993

Related U.S. Application Data

[63] Continuation of Ser. No. 676,792, Mar. 28, 1991, abandoned.
[51] Int. Cl.$^6$ ............................................. G10L 9/00
[52] U.S. Cl. ................................. 395/2.52; 395/2.64
[58] Field of Search .............................. 395/2.4–2.66; 381/40–50

[56] References Cited

U.S. PATENT DOCUMENTS

| | | | |
|---|---|---|---|
| 4,759,068 | 7/1988 | Bahl et al. | 395/2 |
| 4,799,262 | 1/1989 | Feldman et al. | 395/2 |
| 4,817,156 | 3/1989 | Bahl et al. | 395/2 |
| 5,033,087 | 7/1991 | Bahl et al. | 395/2 |
| 5,129,001 | 7/1992 | Bahl et al. | 395/2 |

*Primary Examiner*—Allen R. MacDonald
*Assistant Examiner*—Michelle Doerrler
*Attorney, Agent, or Firm*—Henry D. Pahl, Jr.

[57] ABSTRACT

The method disclosed herein facilitates the generation of a recognition model for a non-standard word uttered by a user in the context of a large vocabulary speech recognition system in which standard vocabulary models are represented by sequences of probability distributions for various acoustic symbols. Along with the probability distributions, a corresponding plurality of converse probability functions are precalculated which represent the likelihood that a particular probability distribution would correspond to a given input acoustic symbol. For a non-standard word uttered, a corresponding sequence of acoustic symbols is generated and, for each such symbol in the sequence, the most likely probability distribution is selected using the converse probability functions. For successive symbols in the utterance, a corresponding sequence of custom converse probability functions are generated, each of which is a composite of weighted contributions from the corresponding precalculated converse probability function and the converse probability functions corresponding to time-adjacent symbols in the utterance. The resulting sequence of custom converse probability functions identify a corresponding sequence of probability distributions which constitute a model of the word uttered, which model incorporates contextual information from the utterance.

7 Claims, 4 Drawing Sheets

METHOD FOR GENERATING A SPEECH RECOGNITION MODEL FOR A NON-VOCABULARY UTTERANCE

This is a continuation of Ser. No. 07/676,792 filed on Mar. 28, 1991, now abandoned.

BACKGROUND OF THE INVENTION

The present invention relates to a large vocabulary speech recognition system and more particularly to such a system incorporates a method for expeditiously generating a recognition model for a non-standard word uttered by a user.

Large vocabulary speech recognition systems typically use statistical reference models to represent each word in the standard vocabulary, e.g. Hidden Markov Models (HMM). During the setting up and training of such a speech recognition system and the establishment of its standard vocabulary, a number of probability distributions are generated or obtained from heavily redundant training data. The redundancy in the training data allows for reasonable probability distributions to be obtained.

The user of a large vocabulary speech recognition system, however, is very likely to encounter vocabulary omission errors, i.e. instances when the system cannot recognize a desired input utterance because it has not been trained to do so beforehand. Clearly, the user will wish to correct this omission with a minimum of effort, preferably by merely informing the system about the identity of the utterance spoken. However, existing techniques for the creation of reference models are inappropriate for the expeditious addition of non-standard words since they are both computationally extensive and do not work well with a single example or utterance to define the new word. The difficulty is further compounded by the fact that the system will typically have no information about the new word other than the acoustic pattern of the utterance itself. For example, it will typically not be reasonable to provide a phonetic transcription of the new word which would facilitate generation of a new model from existing phoneme data. This problem is particularly common for items such as proper names.

Among the several objects of the present invention are the provision of a method for adding non-standard words to a large vocabulary speech recognition system; the provision of such a method which can permit such an addition based upon a single utterance or example; the provision of such a method which will produce a high quality model which can be reliably used to recognize other instances of the same word; the provision of such a method which is not computationally demanding; the provision of such a method which can be easily utilized by a user without undue interruption of the user's work; the provision of such a method which is highly reliable and which is of relatively simple and inexpensive implementation.

SUMMARY OF THE INVENTION

The method of the present invention is applicable to a large vocabulary speech recognition system in which standard vocabulary models are represented by sequences of probability distributions for preselected acoustic symbols. The standard distributions are preferably obtained from heavily redundant training data. Along with the probability distributions, a corresponding plurality of converse probability functions are precalculated. These converse probability functions represent the likelihood that a particular probability distribution would correspond to a given input acoustic symbol. For a non-standard word uttered by a user, a corresponding utterance sequence of acoustic symbols is generated. For each symbol in the utterance, a corresponding converse probability function is selected. For successive symbols in the utterance sequence, custom converse probability functions are generated, each of which is a composite of weighted contributions from the corresponding converse probability function and the converse probability functions corresponding to time-adjacent symbols in the utterance sequence. The sequence of custom converse functions identify a corresponding sequence of probability distributions which provides a model of the word uttered by the user and that model incorporates contextual information from the utterance.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
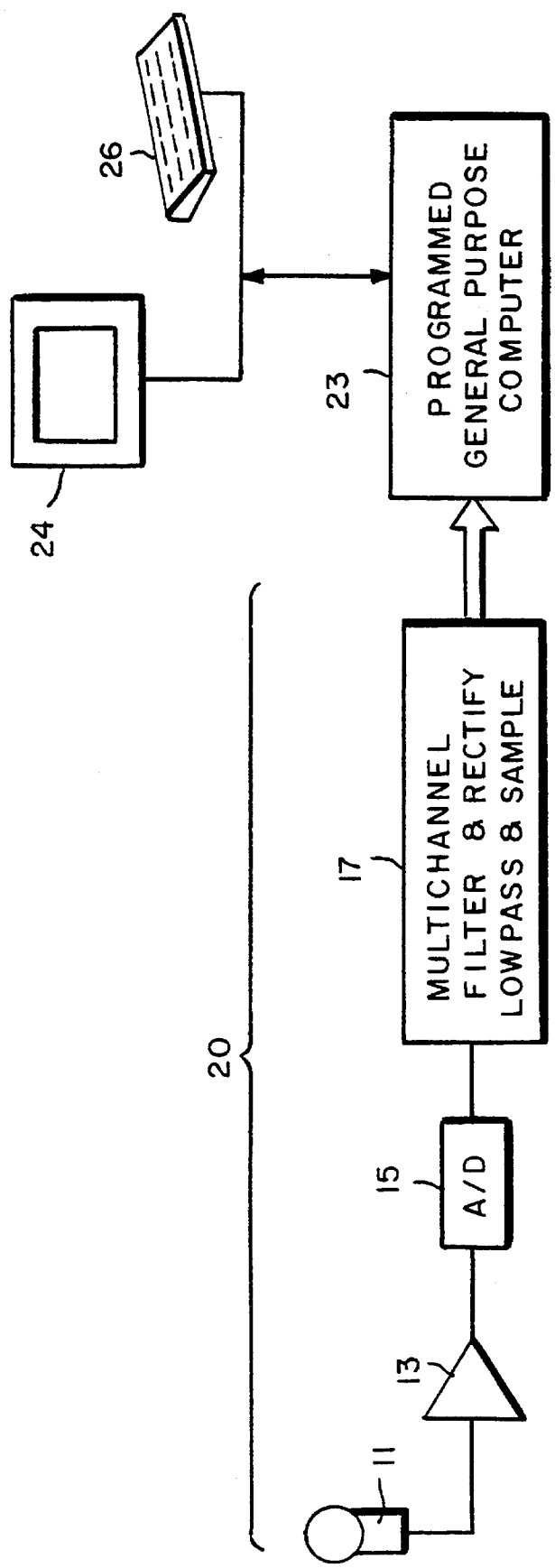
FIG. 1 is a block diagram of the electronic components employed in one embodiment of the speech recognition system of the present invention.

In common with many prior art systems, the apparatus of the present invention operates by first transducing acoustic speech waveform to obtain corresponding electrical signals and then digitizes that signal. With reference to FIG. 1, the transducer there indicated is a microphone 11 which is connected, through a suitable preamplifier 13, to an analog-to-digital converter 15. As is also usual in the art, the speech signal is treated to obtain, at a succession of sample times, a sequence of digital values which characterize the speech. In the embodiment illustrated, these values are obtained by passing the speech signal through a digital filter bank and then rectifying, low pass filtering, and sampling the outputs of the various channels to obtain values representing the energy levels within the corresponding passbands. The collection of digital values defining the input spectrum at a given moment of time is referred to hereinafter as a frame.

In FIG. 1, the filtering, rectifying, low pass filtering and sampling circuitry is indicated generally by reference character 17. The digital filter bank, rectifyer and sampling system 17 may, for example, be efficiently implemented using commercilly available digital signal processing integrated circuits. Preferably, one of the passbands encompass the entire effective speech spectrum so as to provide a channel useful in identifying the beginning and ends of words although, in other embodiments, some or all of the passbands may be used for this purpose.

As thus far described, the front end portion of the system is essentially similar to that described in coassigned U.S. Pat. No. 4,799,262 issued Jan. 17, 1989 to Joel A. Feldman, Wm. F. Ganong III, and Scott Bradner, and entitled "Speech Recognition". The disclosure of that patent is incorporated herein by reference.

Collectively, the front end circuitry is identified by reference character 20. Though the multichannel filter bank is illustrated as being implemented digitally, it should be understood that analog filtering followed by analog-to-digital conversion might also be used. Likewise, while multichannel filtering is presently preferred, it should be understood that other methods of treating or encoding the raw input signal might also be employed, for example, linear predictive encoding which might also be done by special purpose hardware.

A general purpose microcomputer system 23, e.g. one employing a Intel 80386 microprocessor, is provided for general system management and control functions, as well as for processing of the distance calculations. As is conventional, computer 23 incorporates a video display 24 and a keyboard 26 for providing interaction with the system user.

As indicated previously, the front end circuitry 20 is operative to provide, at each of a succession of sample times, a "frame" of digital data which characterizes input speech. As is also understood by those skilled in the art, it is often necessary that electronic systems which are to recognize a large vocabulary be trained by gathering a collection of data tokens from a representative speaker or group of speakers or from those persons whose speech is to be recognized. In the embodiment described herein, the computer 23 runs a program in which the subject speakers are presented, through the video display, with a series of words which are to be spoken into the microphone. For each such spoken word, a sequence of data frames or spectra are generated and these sequences are stored by the computer.

The preferred embodiment of the present invention contemplates that the user will establish a list of standard frames which will be effective in differentiating different speech sounds appearing in the vocabulary required by the user. As will be understood by those skilled in the art, the content of each standard frame will depend, not only upon the particular method of encoding, i.e. multichannel filtering or linear predictive encoding, but also upon the requirements of the user's application and the vocabulary which it is desired to recognize. Typically, the list of standard frames will be based upon actual samples of the speaker whose voice is to be recognized. In other words, the list of standard frames will be generated as a result of a training session in which the speaker is asked to repeatedly voice phrases including the type of information which the system is to recognize and, from the data thereby accumulated, a representative list of characteristic frames is generated. Alternatively, the standard frames can be precalculated from a knowledge or database drawn from a large number of speakers.

While each standard frame may be considered to be a multidimensional vector as understood by those skilled in the art, each of the standard frames is preferably represented by an encoded index or symbol to reduce the amount of data which must be stored and manipulated in the subsequent processes performed by the apparatus of the present invention.

During speech recognition after training, the system does not utilize the raw data frames or spectra generated by the front end components. Rather, the computer preferably calculates the distance between each of the incoming data frames and each of the pre-established collection of standard frames and then substitutes for the raw data frame the closest matching standard frame or symbols. Thus, prior to any attempt at any word recognition, each input utterance specimen is converted to a sequence of standard frames or symbols. The process of substituting standard frames or symbols for the raw input frames is often referred to as vector quantization. This procedure is also used in the apparatus of U.S. Pat. No. 4,799,262 referenced previously.

In speech recognition systeme utilizing statistical methods, e.g. those employing Hidden Markov Modelling, the recognition model for each word in the system's vocabulary is typically represented by a sequence of probability distributions. Each probability distribution defines the likelihood of each type of symbol occurring at the corresponding time position. For facilitating calculations during the recognition process and in the method of the present invention, the probability distributions are preferably represented as negative log probabilities. The time positions in the recognition models are also referred to hereinafter as "states". During the recognition process, input utterances are time aligned with each of the models, or selected subsets thereof, and an overall likelihood of match is calculated. Time alignment is typically implemented by means of so-called Viterbi decoding. The identity of the best match or matches are then provided as the system output.

As indicated previously, each probability distribution specifies the likelihood of observing a particular input symbol at the temporal position of that state in the model when a sequence of symbols representing the respective word is time aligned with the model. Thus, $$Pr(a\_i | s(n)) \qquad (1)$$

is the probability of observing symbol $a\_i$ at state $s(n)$.

While a separate or unique probability distribution may be used at each time position in each model, it is preferable to also quantize the probability distributions. In other words, a limited set of standard probability distributions are generated from the vocabulary database and appropriate ones of these standard probability distributions are selected in making up the vocabulary models.

Typically, the vocabulary recognition models and the associated symbol observation probability distributions are computed by an iterative training procedure such as the Forward-Backward algorithm. In these methods, the training patterns are repeatedly aligned with a model using initial probability distributions (as in equation 1) and the occurrences of particular input symbols at specific model locations are observed and counted. The count observations are then converted into updated probability distributions. The success of the process hinges on the availability of a substantial number of exemplars of each word spoken one or a number of training speakers. Clearly, if the training is done with only one input pattern, each distribution is likely to be based on only one or a few counts depending on the average number of model states per input frame. Since the sequence of symbols making up consecutive utterances of the same word can be quite variable, probability distribution based on a single observation will be extremely unreliable.

The training data requirement and speed of computation make this manner of adding words unacceptable to a user of a recognition system who would like to create a new model quickly after speaking a word only once.

In accordance with one aspect of the present invention, it has been recognized that the vocabulary database can also be used to calculate converse probability functions $$Pr(s\_j | a\_i) \qquad (2)$$

which represent the probability that a particular reference state $s\_j$ should be selected given that the input signal symbol is $a\_i$. These converse functions may be considered as being a mapping distribution. These conditional probabilities or converse functions can be estimated during initial off-line training or setting up from counts of input symbol and state co-occurrences as follows:

$$Pr(s\_j | a\_i) = \frac{[Pr(a\_i | s\_j) * Pr(s\_j)]}{Pr(a\_i)} \quad (3)$$

In terms of co-occurence counts:

$$Pr(a\_i | s\_j) = \frac{C(a\_i, s\_j)}{\text{Sum}\_i\, C(a\_i, s\_j)} \quad (4)$$

$$Pr(s\_j) = \frac{\text{Sum}\_i\, C(a\_i, s\_j)}{\text{Sum}\_i\, \text{Sum}\_j\, C(a\_i, s\_j)} \quad (5)$$

$$Pr(a\_i) = \frac{\text{Sum}\_j\, C(a\_i, s\_j)}{\text{Sum}\_i\, \text{Sum}\_j\, C(a\_i, s\_j)} \quad (6)$$

Then $$Pr(s\_j | a\_i) = \frac{C(a\_i, s\_j)}{\text{Sum}\_j\, C(a\_i, s\_j)} \quad (7)$$

where C stands for counts. In the above formulas, the expression "sum_" is used for summation, e.g.

$$\left( \text{Sum}\_i = \sum_i \right)$$

The co-occurrence count distributions may be smoothed using a number of methods standard in HMM research.

It would be possible to use the mapping distribution (8) directly to convert an input symbol sequence into a sequence of reference model states or probability distributions by evaluating $$s(t) = \underset{1 <= j <= J}{\text{argmax}} \; (Pr(s\_j | x(t))) \quad (8)$$

for each input symbol x(t). If we define $$LPr(s\_j | a\_i) = -\log(Pr(s\_j | a\_i)) \quad (9)$$

then equation (14) can be written as $$s(t) = \underset{1 <= j <= J}{\text{argmin}} \; (LPr(s\_j | x(t))) \quad (10)$$

Each input symbol would thus be replaced by the most likely state with its associated input symbol probability distribution.

A direct remapping would, however, not be satisfactory. The reason for this is that many of the mapping distributions are multimodal, or in other words, a particular input symbol can be used in a number of distinct model contexts. Using the mapping distribution directly would always result in the choice of the most probable state at the exclusion of other, possibly more appropriate but marginally less probable choices. It is thus necessary to make the state selection more robust. This is done as follows.

In accordance with another aspect of the present invention, context information is utilized to overcome the problems with direct remapping. Context information is extracted from a single utterance by considering, for each input symbol, not only the converse function directly associated with that symbol but also the converse functions of its time adjacent neighbors. A custom converse probability function is calculated which is a composite of weighted contributions from the precalculated probability function corresponding to the respective symbol and the precalculated probability functions corresponding to time adjacent symbols in the utterance sequence. A simplified example, using one time position to either side of the given state, is illustrated diagrammatically in FIG. 3. Since each input symbol is likely associated with a number of different likely reference states, it is important to select the state which is appropriate given the acoustic context of the input symbol in the input word. The present algorithm accomplishes the context selection essentially by solving equation (10) simultaneously for a block of input symbols which are adjacent in the input pattern, as is represented as follows:

$$s(t) = \underset{1 <= j <= J}{\text{argmin}} \left[ \underset{k=-w}{\overset{k=w}{\text{Sum}}} \; \{win(k) * LPr(s\_j | x(t+k))\} \right] \quad (11)$$

The log-mapping functions of the adjacent symbols are averaged after a weighting with a window "win()" which emphasizes near neighbors and deemphasizes the contributions of distant neighbors. Since the sequence of adjacent symbols describes a specific acoustic context in the input pattern, the weighted averaging of the individual mapping functions can be viewed as a reinforcement of the most likely common state for that context, that is, as illustrated diagrammatically in FIG. 3.

In one commercial embodiment of the present invention, a simple symmetrical triangular moving window of the form win()=(1, 2, 3, 2, 1)

is utilized in which two symbols on either side of the given symbol are utilized with weight decreasing linearly with distance or time separation.

An alternative for the windowing function would be to precompute a matrix of position-dependent input symbol co-occurrence probabilities by aligning exemplars of any available training words (e.g., using the well known Viterbi algorithm). This can be done off-line and does not depend on the availability of a specific set of training utterances. First, compute how often symbols co-occurr k frames apart:

Pr(a_i, a_j, k)     (12)

then, win(t,k)=Pr(x(t+k), x(t), k)**n     (13)

$$s(t) = \underset{1 <= j <= J}{\text{argmin}} \left[ \underset{k=-w}{\overset{k=w}{\text{Sum}}} \; \{win(t,k) * LPr(s\_j | x(t+k))\} \right] \quad (14)$$

where '**n' denotes the nth power. In this manner neighboring symbols which have been observed to co-occurr frequently with x(t) at a specific frame offset k, will receive a strong weighting.

Once a custom converse probability function is calculated for each input symbol, these converse functions may be directly remapped back to standard probability distributions. The sequence of standard probability distributions or states thus obtained can then be employed as a recognition model for subsequent recognition of the utterance word.

Despite being based on a single utterance, it has been found that a model generated in accordance with the method of the present invention is relatively tolerant of the variations which occur in different utterances of the same expression but is yet reasonably reliable in recognizing the expression. This desired robustness is believed to flow from the utilization of contextual information which can be derived from the single utterance when considered in conjunction with the vocabulary database which allows for the precalculation of probability distributions and converse probability functions as described hereinbefore.

Since the probability distributions and converse probability functions are precalculated during initial training and setup of the speech recognition system, a relatively modest amount of computation is required during the creation of a model based on a single utterance. Accordingly, this procedure or method can be utilized during the performing of a user's application program, e.g. the filling in of a structured report form using the speech recognition system.

Figure 2:
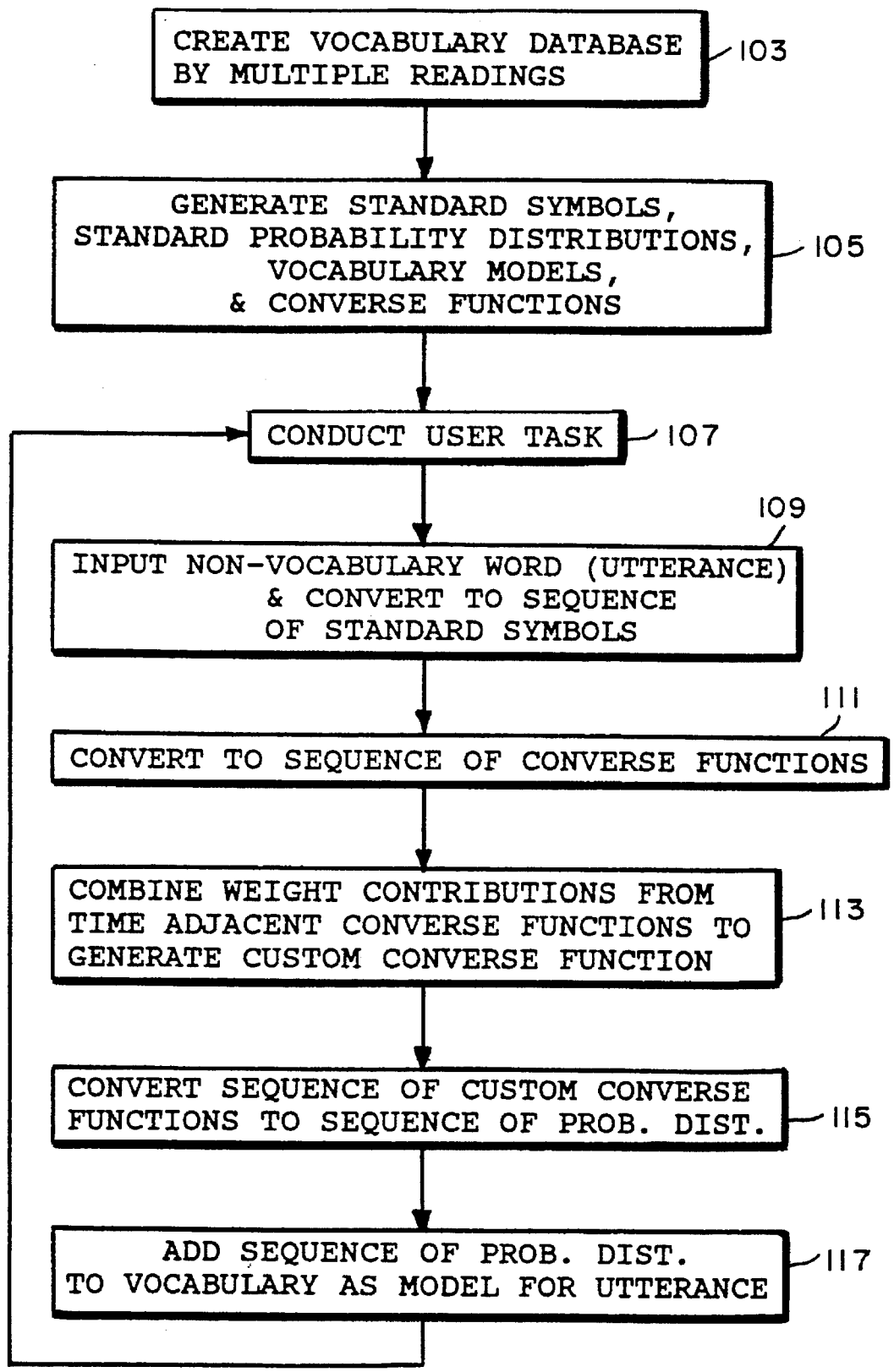
FIG. 2 is a flow chart illustrating the operation of the method of the present invention in cooperation with a large vocabulary speech recognition system employing statistical recognition.

The operation of the method of the present invention in conjunction with a large vocabulary speech recognition system may be summarized with reference to FIG. 2. During initial setup and training of the system, a vocbulary database is created by having representative persons or the user speak multiple examples of each word to be included in the standard vocabulary. This is indicated at block 103.

Using the vocabulary database, a set of standard symbols are generated which can represent arbitrary user input with a desired degree of accuracy. Standard probability distributions are also statistically calculated as are converse functions which represent the likelihood that a particular probability distribution would correspond to a given acoustic symbol. Using the standard probability distributions and the standard symbols, the vocabulary database is further utilized to generate a model for each word to be included in the recognition vocabulary. This is indicated at block 105. At this point, the system is sufficiently trained up so that the user can initiate an application program or task such as the filling in of a structured report form using voice input as indicated at block 107.

At some point in the user task, the user may recognize that he will need to repeatedly input a word which is not within the standard vocabulary. By initiating the operation of a program algorithm which performs the method of the present invention, the user can speak a single utterance of that word and the program can use that limited information, together with the precalculated probability distributions and converse functions, to generate a new model which can be used to reliably recognize the new word or utterance. As indicated in block 109, the new utterance is converted to a sequence of standard symbols. For each symbol in the utterance sequence, a respective precalculated converse probability function is selected as indicated in block 111.

A custom or non-standard converse probability function is then generated for succesive symbols in the utterance sequence by combining weighted contributions from the converse function corresponding to the respective symbol and the respective converse functions corresponding to time adjacent symbols in the utterance sequence. This combining function is indicated in block 113. The custom converse functions are then employed to remap and identify corresponding probability distributions as indicated in block 115. The sequence of probability distributions thereby generated may then be employed as a model of the new utterance for its subsequent recognition in the user task program. In other words, the newly obtained model can be added to the vocabulary as indicated at block 117 and the user can return to his principal task or application.

Alternative Embodiments

While the method or algorithm of the present invention is highly advantageous in its ability to create a robust model from a single utterance, the method can in fact be extended to utilize multiple exemplars to advantage while retaining the advantage of the relatively simple and speedy introduction of a new word into the vocabulary and retaining also the use of contextual information in generating the model. In a typical application, the algorithm would be used to create the initial model for a new word from the first utterance of the word. After subsequent instances of that same new word are stored, the reference model for that word could be recomputed with more reliable data.

Say 'n' utterances are available:

$$(x1(1), x1(2), \ldots x1(T1)) \quad (15)$$
$$(x2(1), x2(2), \ldots x2(T2))$$
$$(xn(1), xn(2), \ldots xn(Tn))$$

where Tn is the duration in frames of the nth one. First, the most representative item would be selected, by identifying the one with the best fit to all the others using a standard Viterbi alignment and the input symbol co-occurrence probabilities $$(Pr(a\_i, a\_j)) \quad (16)$$

as a similarity measure. Say that the best item is the jth one:

$$(xj(1), xj(2), \ldots xj(Tj)) \quad (17)$$

Next, the individual utterances would be aligned with the most representative, resulting in Tj sets of aligned input symbols. E.g.:

$$(xj(1), x1(1), \ldots xn(1)) \quad (18)$$
$$(xj(2), x1(1), x1(2), \ldots xn(2))$$
$$(xj(Tj), x1(T1), \ldots xn(Tn))$$

This can be written as $$(X(1), X(2), \ldots X(Tj)) \quad (19)$$

The remapping equation (11) would be modified to make use of the aligned input symbol groups in (19) rather than a single input symbol:

$$s(t) = \operatorname*{argmin}_{1 \leq j \leq J} \left[ \sum_{k=-w}^{k=w} \{win(k) * (LPr(s\_j|X(t+k)))\} \right] \quad (20)$$

if the member symbols of the set X(t+k) are (a1, a2, ... am) then equation 27 can be written as $$s(t) = \operatorname*{argmin}_{1 \leq j \leq J} \left[ \sum_{k=-w}^{k=w} \{win(k) * LPr(s\_j|a1) + \right.$$
$$\left. (LPr(s\_j|a2) + (LPr(s\_j|a3) + LPr(s\_j)|am))\} \right] \quad (21)$$

The resulting reference model would be Tj states long.

Figure 3:
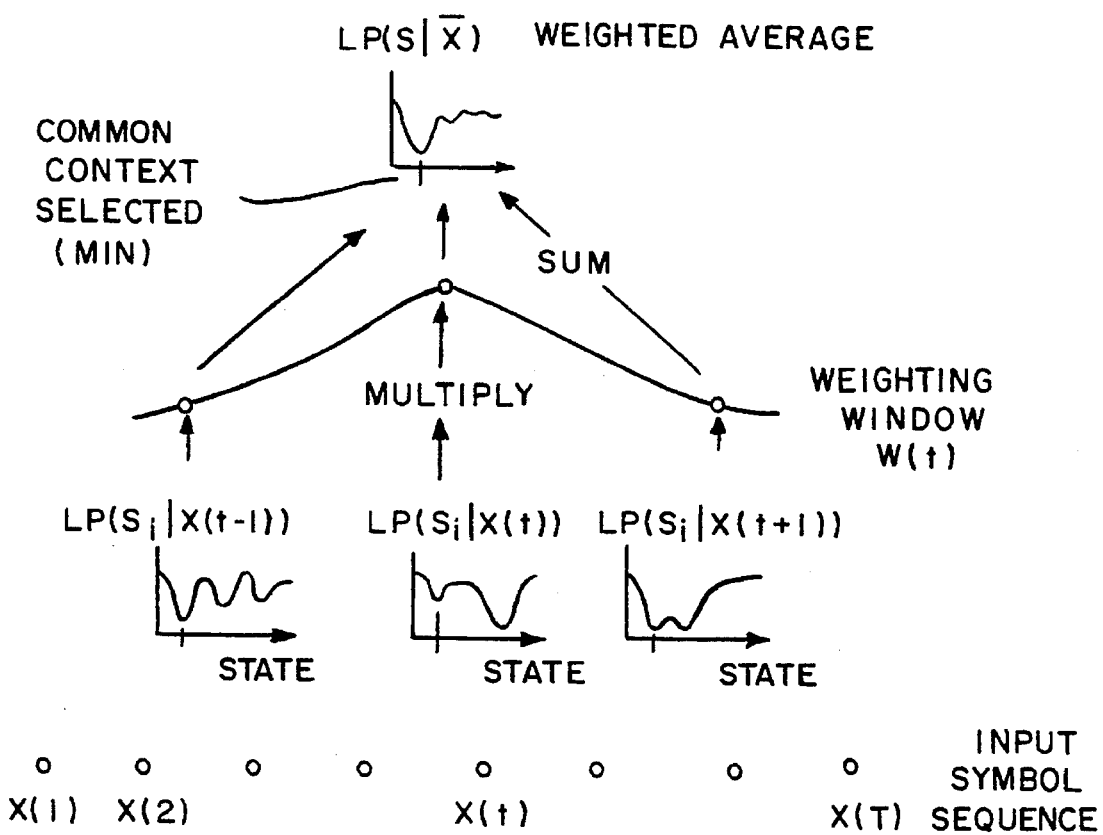
FIG. 3 is a diagram illustrating the generation of a custom converse probability function based on a single utterance.
Figure 4:
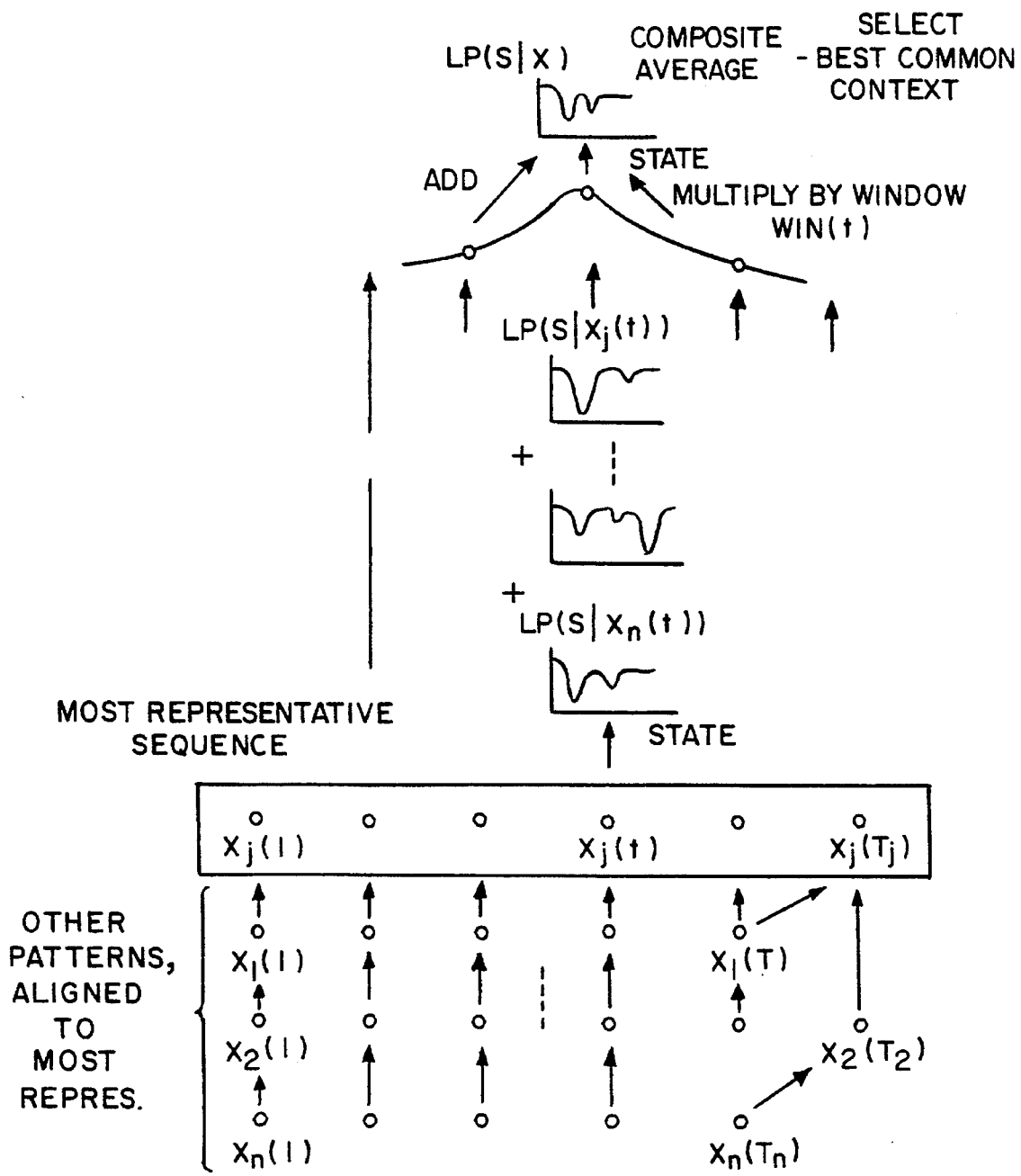
FIG. 4 is a diagram illustrating the generation of a custom converse probability function based on multiple utterances.

This process is illustrated diagrammatically in FIG. 4 which is analogous to FIG. 3.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a speech recognition system in which vocabulary models are represented by sequences of precalculated probability distributions for a predetermined set of acoustic symbols; the method of expeditiously generating a model for a non-vocabulary word uttered by a user, said method comprising:

pre-calculating along with said probability distributions a corresponding set of converse probability functions which represent the probabilities that particular ones of said precalculated probability distributions would correspond to a given input acoustic symbol;

for a non-standard word uttered by a user, generating a corresponding utterance sequence of acoustic symbols;

for each symbol in said utterance sequence, selecting the respective precalculated converse probability function thereby to generate a single valued sequence of said converse probability functions;

for successive symbols in said utterance sequence, generating respective custom converse probability functions each of which is a composite of weighted contributions from the precalculated converse probability function corresponding to the respective symbol and the precalculated converse probability functions corresponding to time-adjacent symbols in the utterance sequence, the weighting of the contributions being independent of the utterance sequence; and for each custom converse probability function, selecting the best matching one of said precalculated probability distributions, whereby the resulting single valued sequence of selected precalculated probability distributions provides a model of the word uttered by the user.

2. The method as set forth in claim 1 wherein said acoustic symbols represent spectral frames and speech input to said recognition system including said nonstandard word is periodically analyzed as to spectral content to obtain said spectral frames.

3. The method as set forth in claim 2 wherein speech input is converted to a sequence of symbols each of which represents a preselected spectral distribution.

4. In a large vocabulary speech recognition system in which standard vocabulary models are represented by sequences of precalculated standard probability distributions for a predetermined set of acoustic symbols, the standard distributions being obtained from heavily redundant training data; the method of expeditiously generating a model for a non-standard word uttered by a user, said method comprising:

pre-calculating along with said standard probability distributions a corresponding set of converse probability functions which represent the probabilities that a particular standard probability distribution would correspond to a given input acoustic symbol;

for a non-standard word uttered by a user, generating a corresponding utterance sequence of acoustic symbols;

for each symbol in said utterance sequence, selecting the respective precalculated converse probability function thereby to generate a single valued sequence of said converse probability functions;

for successive symbols in said utterance sequence, generating respective custom converse probability functions each of which is a composite of weighted contributions from the precalculated converse probability function corresponding to the respective symbol and the precalculated converse probability functions corresponding to time-adjacent symbols in the utterance sequence, the weighting of the contributions being independent of the utterance sequence; and for each custom converse probability function, selecting the best matching one of said precalculated standard probability distributions, whereby the resulting single valued sequence of standard probability distributions provides a model of the nonstandard word uttered by the user which model incorporates contextual information from the utterance.

5. In a large vocabulary speech recognition system in which speech input is periodically analyzed as to spectral content thereby to obtain data frames and the data frames are subsequently represented by a limited predetermined set of acoustic symbols and in which standard vocabulary models are represented by sequences of precalculated standard probability distributions for said acoustic symbols, the standard distributions being obtained from heavily redundant training data; the method of expeditiously generating a model for a nonstandard word uttered by a user, said method comprising:

pre-calculating along with said standard probability distributions a corresponding set of converse probability functions which represent the probabilities that particular ones of said standard probability distribution would correspond to a given input acoustic symbol;

for a non-standard word uttered by a user, generating a corresponding utterance sequence of acoustic symbols;

for each symbol in said utterance sequence, selecting a respective precalculated converse probability function; for successive symbols in said utterance sequence, generating respective custom converse probability functions each of which is a composite of weighted contributions from both the precalculated probability function corresponding to the respective symbol and a moving window which includes the precalculated probability functions corresponding to time-adjacent symbols in the utterance sequence thereby to generate a single valued sequence of said converse probability functions; and for each custom converse probability function, determining a corresponding standard probability distribution whereby the resulting single valued sequence of standard probability distributions provides a model of the non-standard word uttered by the user which model incorporates contextual information from the utterance.

6. The method as set forth in claim 5 wherein said moving window provides a weighting roughly in accordance with the pattern 1-2-3-2-1 where the middle integer represents the weight given to the precalculated converse probability function and the neighboring integers represent the weights given to the correspondingly time adjacent converse probability functions.

7. The method of operating a speech recognition system to facilitate the addition of new words to an existing vocabulary, said method comprising:

generating a vocabulary database by repeated user reading of the vocabulary words;

statistically analyzing said database to identify a set of standard acoustic symbols and a set of standard precalculated probability distributions;

for each word in said vocabulary generating a model which comprises a sequence of standard probability distributions;

precalculating from said database a set of converse probability functions which represents the probabilities that a particular standard probability distribution would correspond to a given input symbol;

for a non-standard word uttered by a user, generating a corresponding utterance sequence of acoustic symbols;

for each symbol in said utterance sequence, selecting the respective precalculated converse probability function thereby to generate a single valued sequence of said converse probability functions;

for successive symbols in said utterance sequence, generating respective custom converse probability functions each of which is a composite of weighted contributions from the precalculated converse probability function corresponding to the the respective symbol and the precalculated converse probability functions corresponding to time-adjacent symbols in the utterance sequence, the weighting of the contributions being predetermined and independent of the utterance sequence; and for each custom converse probability function, determining a corresponding standard probability distribution, whereby the resulting single valued sequence of standard probability distributions provides a model of the non-standard word uttered by the user which model incorporates contextual information from the utterance.

* * * * *